(12) United States Patent
Liou

(10) Patent No.: US 6,505,056 B1
(45) Date of Patent: Jan. 7, 2003

(54) DATA DISPLAYING DEVICE AND A METHOD FOR REQUESTING A DATA UPDATING

(76) Inventor: Wen-Shan Liou, 12th Fl., No. 216 Sec. 2, Tun-Hwa S. Rd., Taipei (TW)

( * ) Notice: Subject to any disclaimer, the term of this patent is extended or adjusted under 35 U.S.C. 154(b) by 0 days.

(21) Appl. No.: 09/340,315

(22) Filed: Jun. 25, 1999

(51) Int. Cl.[7] ................................................ H04B 1/38
(52) U.S. Cl. ...................................... 455/566; 455/418
(58) Field of Search ................................ 455/418, 419, 455/420, 566, 517, 88

(56) References Cited

U.S. PATENT DOCUMENTS

| | | | | | |
|---|---|---|---|---|---|
| 5,046,002 A | * | 9/1991 | Takashi et al. | ............. | 364/200 |
| 6,041,124 A | * | 3/2000 | Sugita | ........................ | 380/270 |
| 6,052,606 A | * | 4/2000 | Bowen | ........................ | 455/566 |
| 6,091,956 A | * | 7/2000 | Holenberg | ................... | 455/456 |
| 6,304,746 B1 | * | 10/2001 | Fascenda et al. | .......... | 455/31.3 |

* cited by examiner

*Primary Examiner*—Nguyen T. Vo
*Assistant Examiner*—Nghi H. Ly
(74) *Attorney, Agent, or Firm*—Ya-Chiao Chang, Esq.

(57) ABSTRACT

A data displaying device for bidirectionally communicating with a far end service station by wired or wireless way is disclosed. According to the data sets displayed on the screen, the data displaying device selectively emits a request updating signal to a service station to request the service station to transfer part of updating data. Thus, the service station may reduce the transfer data amount greatly, thus the load of bandwidth is decreased. When a request updating signal is emitted to a service station, the data range of requesting a service station to send ordered updating data includes a data range of screen display.

6 Claims, 4 Drawing Sheets

DATA DISPLAYING DEVICE AND A METHOD FOR REQUESTING A DATA UPDATING

BACKGROUND OF THE INVENTION

The present invention relates to a data displaying device for bidirectionally communicating with a far end service station by wired or wireless way.

In the environment of a point-to-point massage communication, for example a computer communicating with a far end network serve through a network, or a mobile phone or signaling device performing a two-way communication with a far end service station, the problem about the bandwidth of a network is often annoying a service provider.

For example, in a service station for providing the marketing price of stocks. conventionally, in general the service station transmits modified data to users from time to time. If a broadcasting (unidirectional) way is adapted, no problem is induced. But if the communication is a two-way (bidirectional) communication, some problems are generated. Since many users use the system at the same time, and therefore transmitting data is too large to cause problems of insufficient bandwidth. However, since point-to-point communication has its own special advantages, and moreover, Internet is more and more popular nowadays, point-to-point communication is an important communication way. Furthermore, mobile phones (also a point-to-point communication) are also a popular communication way, this further increases the problem of insufficient of bandwidth. Thus, it has an eager demand for solving such a problem.

SUMMARY OF THE INVENTION

Accordingly, the object of the present invention is to provide a data displaying device for bidirectionally communicating with a far end service station by wired or wireless way.

Another object of the present invention is to provide a data displaying device, wherein according to the data set displayed on the screen, the data displaying device selectively emits a request updating signal to a service station to request the service station to transfer part of updating data. Thus, the service station may reduce the transfer data amount greatly, and thus the load of bandwidth is decreased.

A further object of the present invention is to provide a data displaying method, which is performed by software programs, thereby, the data required is reduced greatly.

In order to achieve above object, a data displaying device for bidirectionally communicating with a far end service station by wired or wireless way. The device includes a screen, a switch, a processor, a transceiver, display moving keys, a first memory, and a second memory. After the display moving keys are clicked, processor determines whether a request signal is emitted. If it is determined to emit a request signal, the request signal includes the range of data to be updated, and the range of data to be updated includes the data displayed on the screen at present.

The method disclosed in the present invention will actively or passively check whether the display moving key is actuated. If yes, then it will determine whether a request updating signal should be emitted. Otherwise, it will keep on checking whether the display moving key is actuated. However, although various ways may be used to determine when a request updating signal should be emitted, in the present invention, it is suggested to determine whether the boundary of the data to be displayed next is near or reaches the boundary of the previous updating data. If yes, then emitting a data request signal to the service station. Such a judgement is not conventional, namely, the basis for determining "sending a request updating signal" is not only dependent on time.

The present invention will be better understood and its numerous objects and advantages will become apparent to those skilled in the art by referencing to the following drawings in which:

DETAILED DESCRIPTION OF THE PREFERRED EMBODIMENT

Figure 1:
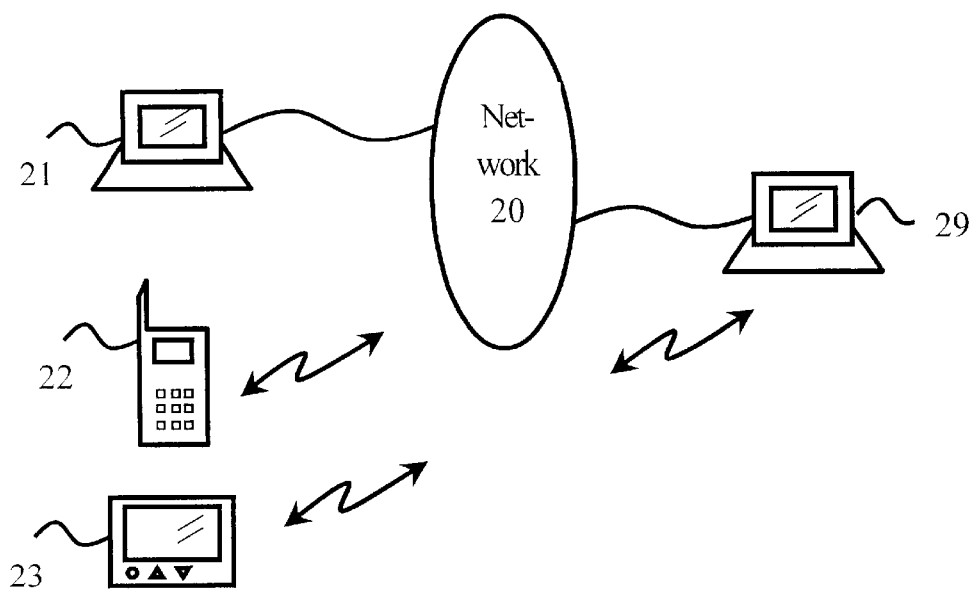
FIG. 1 is a schematic view showing the environment of the application of the present invention.

With reference to FIG. 1, an environment for message communication by point-to-point manner is illustrated. The subscriber end bidirectionally communicates with a far end service station 29 through wire or wireless communication. For example, a user may use a computer 21 to communicate with a service station 29 (such as a network server) through a network 20 (such as internet), or by a wireless communication, a user may use a mobile phone 22 or signal transmitter 23 to bidirectionally communicates with a service station 29. Such kind of device which may communicate bidirectionally with a far end service station 29 is herein referred as an "data displaying device 30".

Figure 2:
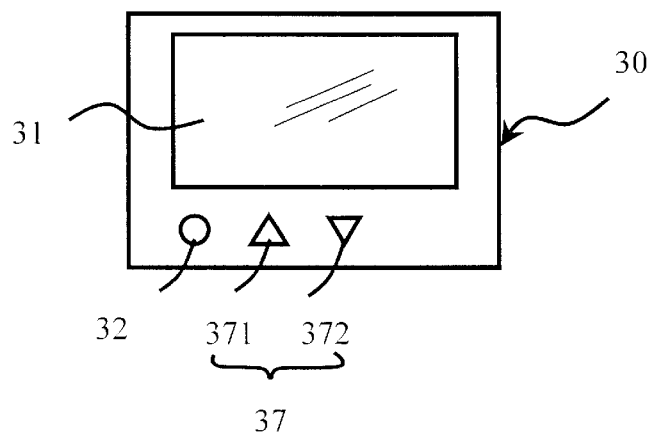
FIG. 2 shows the outlook of the data displaying device according to the present invention.

The embodiment of the outlook of a data displaying device is shown in FIG. 2. The shape of the data displaying device, for example, a signal transmitter 23, has at least a screen 31 for displaying data. Besides, some moving keys 37 are displayed for updating the data contents of the screen 31. For example, a move up key 371 and a move down key 372. Thus, thereby, a user may view data downwards or upwards. Moreover, the moving key may be a move left key or a move right key or a page up key or a page down key. The design of moving keys is determined by the display manner of data.

Figure 3:
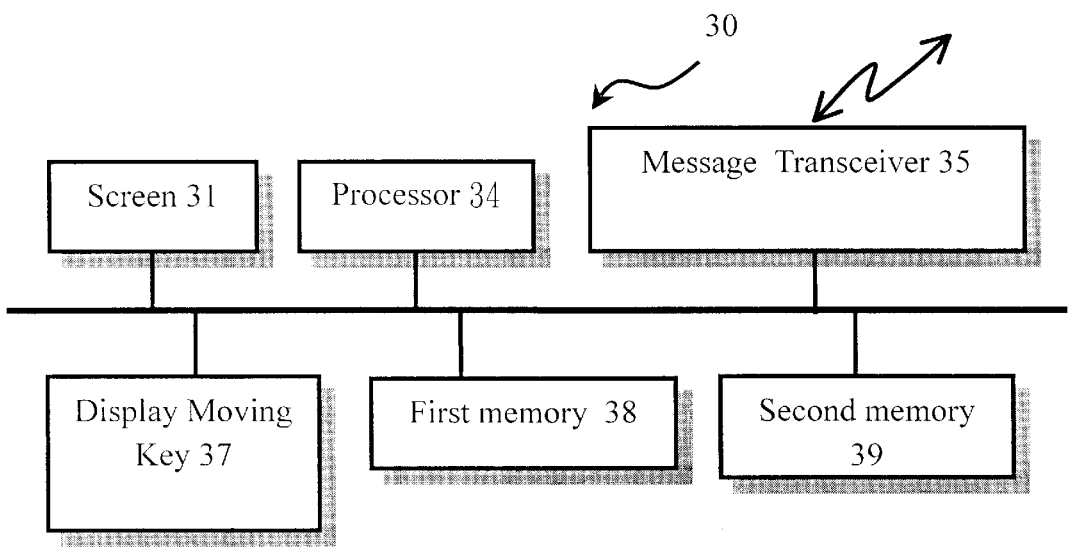
FIG. 3 shows the element structure of the data displaying device according to the present invention.

Referring further to FIG. 3, the components of the data displaying device is illustrated. Other than the components described above, the present invention further includes a switch 32, a processor 34, a transceiver 35, a first memory 38 and a second memory 39. The first memory 38 serves to store the data from the service station 29, for example the memory may be a readable access memory RAM. The second memory 39 contains software programs, for example, the memory may be a read only memory ROM which is written with software program. The transceiver 35 serves to bidirectionally communicate with a far end service station 29 by wire or wireless way. If data communication is performed by wire communication, the transceiver 35 may be a modem. If the data transformation is performed through wireless communication, then the signal transceiver 35 is a wireless transceiver. The processor 34 serves to process the transceiver 35. The memories 38 and 39 and screen 31 serve to display the operation of the moving keys and performed the software program within the second memory 39.

Figure 4:
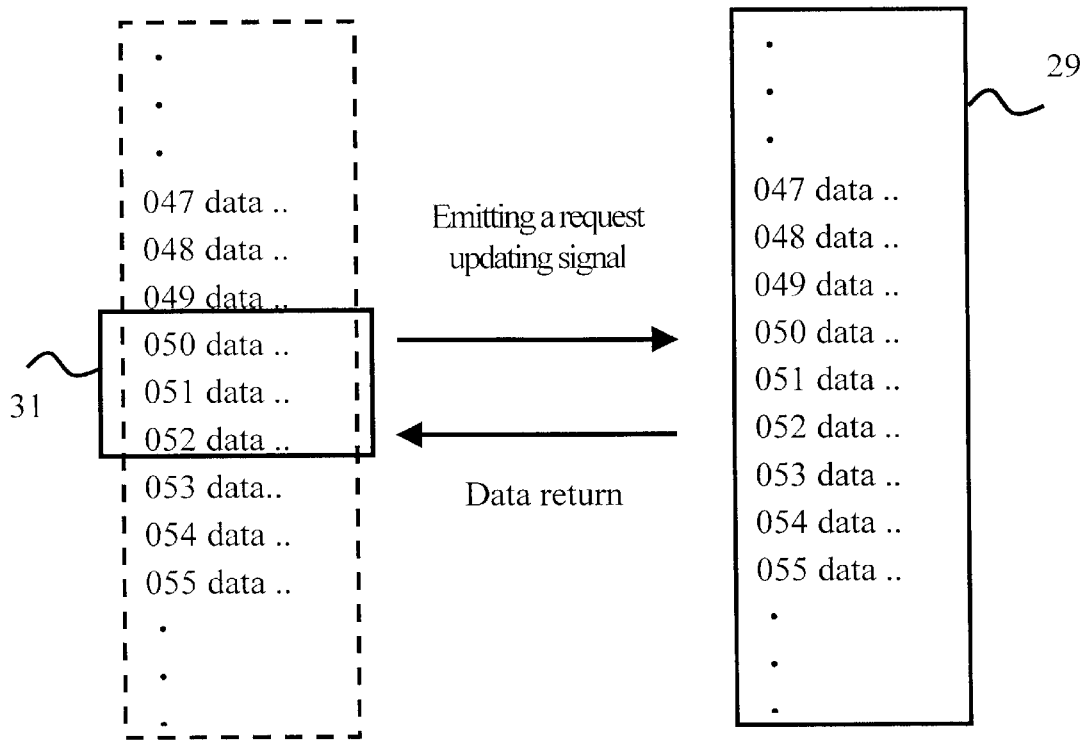
FIG. 4 is a schematic view showing data transmission according to the present invention.
Figure 5:
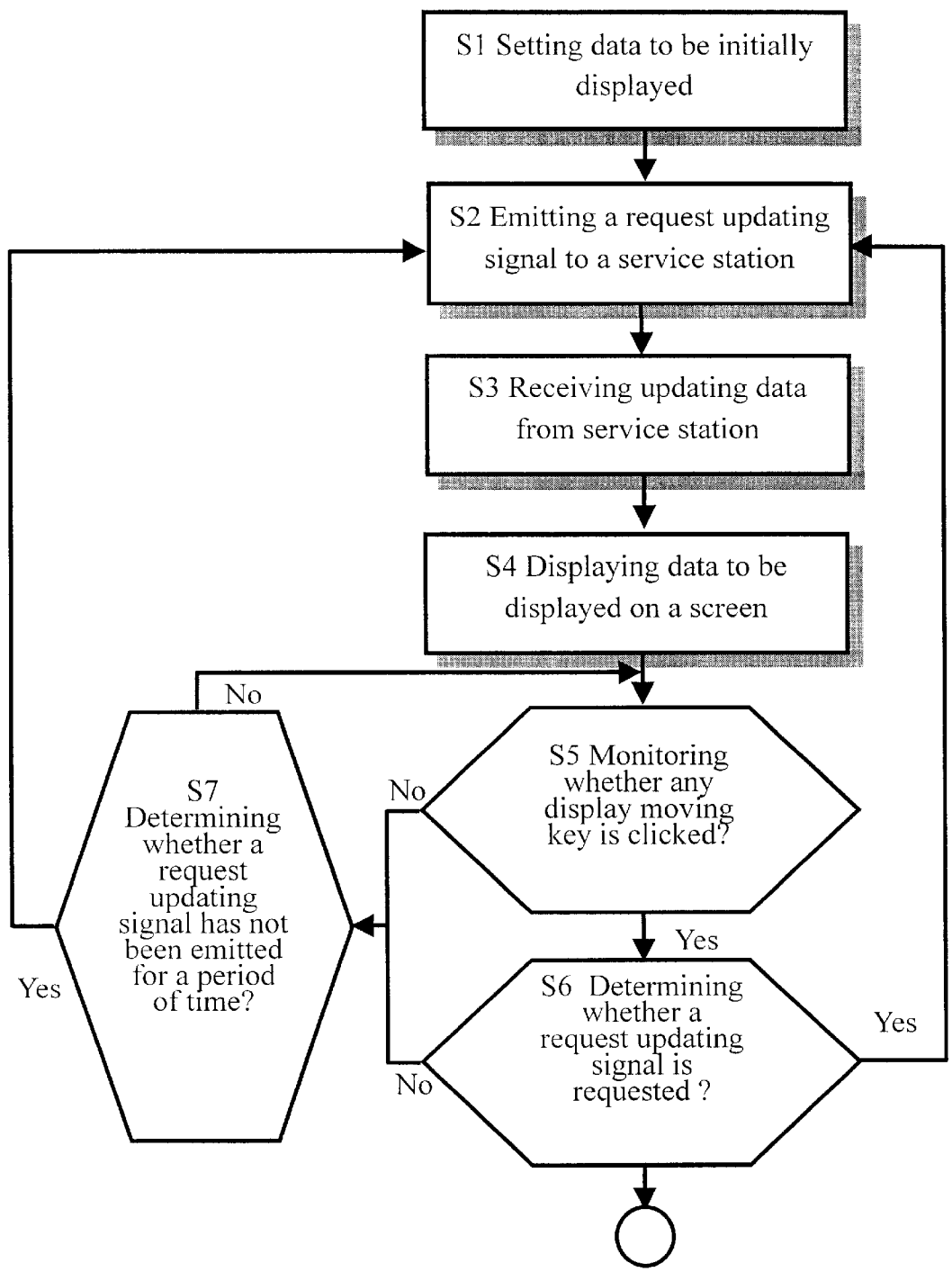
FIG. 5 shows the flow chart of the present invention.
Figure 6:
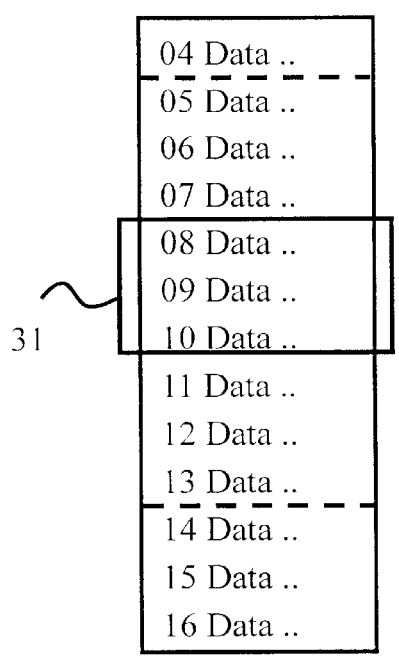
FIGS. 6~9 shows an embodiment of the application of the present invention.

Referring now to FIG. 4, the schematic view of the data transmission of the present invention is illustrated. The left side shows memory data stored in the first memory 38 of the data displaying device 30. For example, if the data displaying device 30 serves to display the simultaneous market prices of stocks, then the first memory 38 is used to store the current trading price of stocks. The service station 29 serves to send the data about the current trading stock to the data displaying device 30. In the conventional way, the service station 29 generally sends modified data to the data displaying device 39 in a fixed time interval. But in the present invention, the modified data is based on the data on the screen 31 viewed by the user. For example, the data displayed on the screen 31, at present, is 050'th, 051'th, 052'th data sets. When the data is desired to be updated, the 050'th, 051'th, 052'th data sets and adjacent data sets (such as 047, 048, 049, 053, 054, and 055'ths data sets) will be updated. The following will describe the flow chart of the present invention as that shown in FIG. 5, further referring to FIGS. 6~9.

When a user uses a data displaying device 30, initially, the data (arranged in order) displaying device 30 sets the initial data to be displayed (step S1). In general, the preceding several data sets are displayed at first, for example, if the screen 31 may display 3 sets of data at a time, then initially, the screen 31 displays the first 3 data sets.

Therefore, in "step S2", the data displaying device 30 emits a data request signal to the service station 29 to request at least preceding 3 data sets. But in a preferred way, the data sets near the preceding 3 data sets also requires, for example, the preceding 6 data sets are necessary to be sent. Accordingly, as a user clicks the move down key 372 for viewing $2^{nd}$, $3^{rd}$, and $4^{th}$ data sets, the $4^{th}$ data set has been prepared. At this time, the data displaying device 30 need not emit the data request signal to the service station 29 immediately.

Next, in "step S3", the data displaying device 30 receives the updating data from the service station 29, once the updating data is received, in "step S4", the screen 31 displays the updated data.

After the initial setting is displayed, in "step S5", the data displaying device 30 monitors whether the moving key 37 is clicked. If yes, the process proceeds "step S6", otherwise, the process proceeds "step S7".

In "step S6", the process determines whether a request updating signal should be emitted, and several ways may be used for this judgement. For example, when the move up key 371 (or move down key 372) is clicked three times continuously, then it is decided that the request updating signal is emitted. Or, in another aspect, the process determines whether the boundary to be displayed next is near the boundary of the previous updating data (referring to the description about FIGS. 6~9). Or, if the data contents displayed in the screen 31 is probably over the range of the previous updating data after the moving key 37 is clicked twice, then the process sends a request updating signal to the service station 29. In "step S6", if the process determines to send a request updating signal, then the process enters into "step S2" again.

In "step S7", the process determines whether the request updating signal has not been sent after a preset time is elapsed. For example, when a user is viewing the 2~5ths data sets for over a preset time, however the display moving key 37 has never been clicked, or in "step S6", the requirement of emitting request updating signal does not been reached. Since the time elapsed is too long, and no data is updated, thus it is preferred that "step S2" is preformed. It should be noted that the judgement of the "sending request updating signal" according to time period is a conventional way, but in the present invention it is an auxiliary procedure.

Figure 7:
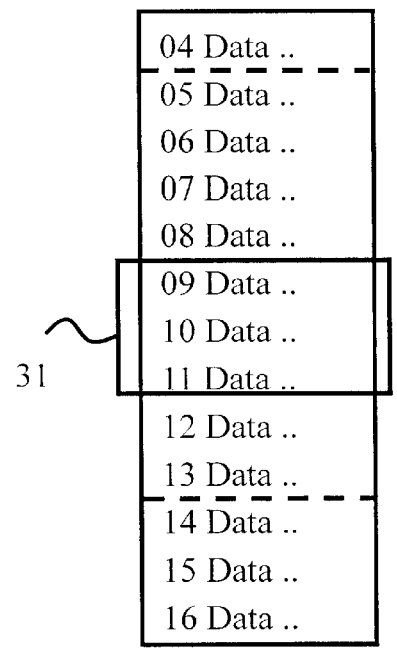

With reference to FIGS. 6~9 for further understanding the "step S6". For example, in FIG. 6, the present updating data is 5~13th data sets, while the screen displays $8^{th}$, $9^{th}$, and $10^{th}$ data sets, namely, the updating data includes the current displaying data and the adjacent data (such as $5^{th}$, $6^{th}$, $7^{th}$, $11^{th}$, $12^{th}$, and $13^{th}$ data sets). FIG. 7 shows that after the user clicks the move down key 372, the screen 31 displays $9^{th}$, $10^{th}$ and $11^{th}$ data sets. Now the process determines whether the boundary of the data to be displayed ($9^{th}$, $10^{th}$ and $11^{th}$ data sets) is near to or reaches the boundary of the previous updating data (5~$13^{th}$data seta). In this example, the boundary of the data to be displayed is $9^{th}$and $11^{th}$ data sets, while the boundary of the previous updating data is $5^{th}$ and $13^{th}$ data sets. Therefore, in this example, it may consider whether the $11^{th}$ data set is near the $13^{th}$ data set. If the software program set that "near" is meant only a difference of one data set, then the condition shows in FIG. 7 has not reached the requirement of "sending request updating signal".

Figure 8:
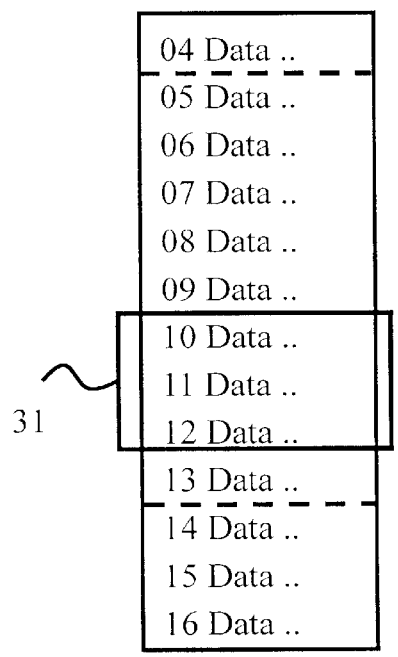
Figure 9:
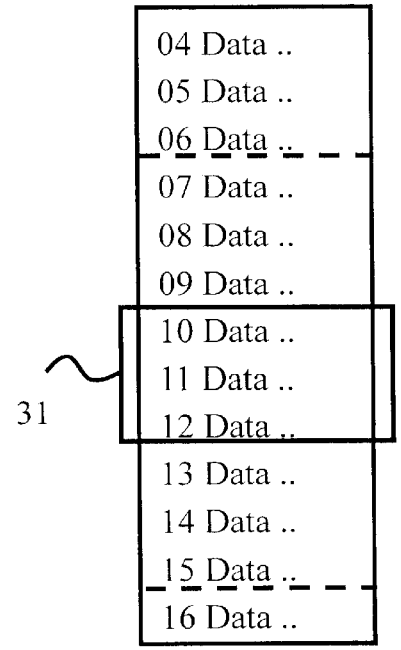

FIG. 8 shows that after the user clicks the move down key 372, the screen 31 will display $10^{th}$, $11^{th}$ and $12^{th}$ data sets. Since the $12^{th}$ data sets (boundary of data to be displayed) has been near the $13^{th}$ data set (boundary of previous updating data), thus it has reaches the requirement of "sending request updating signal", namely, "step S2" is performed. FIG. 9 shows the data condition after the data is updated, namely, the range of new updating data is 5~$13^{th}$ data sets (including current displaying data).

When the "sending request updating signal" is necessary to be sent may be considered according to the following suggestion:

Assume the updating data includes the proceeding P pieces of data sets and following P pieces of data sets around the current displaying data, while each time the display moving key 37 is clicked, there is k piece of data scrolled. Also assume that after the moving key has been clicked N times, then the process determines to send a request updating signal to the service station 29. The value of N is suggested as follows:

$0 \leq N \leq (P/K-T)$, wherein $T \geq 0$ $0 \leq N \leq (P/K-T)$ $T \geq 0$

T is a delay preset value. If the more busy the network is, the slower data is transferred, or the more frequent that the display moving key 37 is clicked, then the value of T should be larger. According to aforementioned embodiment, P=3, K=1, T=1, and N=2. Namely, if the boundaries of the data to be displayed has a difference of one data sets to reach the boundary of previous updating data, then the request updating signal is decided to be sent to the service station. For another example, when T value is set to be 0, then N may be set to be 3. Once N is equal to 3, only when the boundary of the data to be displayed has reached the boundary of the previous updating data, then will the process determine to send a request updating signal to the service station.

By aforementioned method, the data transferred from the service station to the data displaying device can be reduced, and aforementioned method is very helpful to the bandwidth. Of a network It should be appreciated that above description is only an embodiment, not to confine the present invention. For example, in "step S6", sending a request updating signal may be emitted when the boundary of data to be displayed has reached the boundary of the previous updating data. For example, in aforementioned embodiment (FIGS. 6~9), when the screen 31 shows the $11^{th}$, $12^{th}$ and $13^{th}$ data sets, then operation of "sending a request updating signal" is performed. All such modifications are within the scope of the present invention.

Although the present invention has been described using specified embodiment, the examples are meant to be illustrative and not restrictive. It is clear that many other variations would be possible without departing from the basic approach, demonstrated in the present invention. Therefore, all such variations are intended to be embraced within the scope of the invention as defined in the appended claims.

What is claimed is:

1. A data displaying device for bidirectionally communicating with a far end service station by wired or wireless communication, comprising:

a transceiver for emitting a request updating signal to said service station and receiving the updating data from said service station;

first memory means for storing data from said service station;

second memory means for storing executable software programs;

a screen for displaying part of data within said memories, wherein the displaying data is arranged in order;

display moving means for changing the boundary of data being displayed by said screen;

a processor for processing the operation flow of said transceiver, memories means, screen and display moving means, and performing the software program;

through aforementioned structure, when the display moving means is actuated, the processor determines automatically or passively whether a request updating signal is necessary to be sent to said service station, if it determines to send a request signal, said request updating signal including the boundary of updating data, and said boundary of updating data including the data to be displayed on the screen wherein said processor determines whether said request updating signal is necessary to be sent by comparing the range of the data contents to be displayed in said screen after said display moving means is actuated with the range of previous updating data, assuming after said display moving means being actuated N times, the data contents displayed on said screen is probably over the range of the previous updating data, then said request updating signal being sent to said service station, wherein $0 \leq N \leq (P/K)$, P representing the number of updating data sets beyond above or below the currently displayed data, and K representing the number of scrolled data sets each time said display moving means being actuated.

2. The data displaying device as claimed in claim 1, wherein said display moving means are a move down key and a move up key.

3. The data displaying device as claimed in claim 1, wherein said display moving means are a page up key and a page down key.

4. A method for requesting updating data, which is used by a data displaying device, wherein the data displaying device is bidirectionally communicated with a far end service station by wired or wireless communications, the data displaying device includes a transceiver for emitting updating data request signals to a service station, and receives updating signals from said service station, said data displaying device has a screen for displaying received signals and display moving key for updating the boundary of the data displayed in the screen, when the data displaying device uses the method, the data transferred from the service station to the data displaying device is reduced, wherein the method comprises the following steps:

step A: setting the initial N data sets displayed on the screen;

step B: sending a request updating signal to the service station to request the service station to send P updating data sets arranged in order, wherein the range of the P updating data sets includes the N data sets displays on the screen;

step C: receiving the P updating data sets from the service station;

step D: displaying N data sets;

step E: checking whether any display moving key is clicked, if yes, then the process proceeds step F, otherwise the process returns to step E; and step F: determining whether a request updating signal is requested, if yes, step B is performed, otherwise, step E is performed.

5. The data updating method as claimed in claim 4, wherein in step F, the process determines whether the boundary of the N data sets to be displayed is near the boundary of the previous updating P data sets, if, yes, step B is performed.

6. The data updating method as claimed in claim 4, wherein if a period of time is elapsed, the data is not updated, then step B is performed.

* * * * *

UNITED STATES PATENT AND TRADEMARK OFFICE
CERTIFICATE OF CORRECTION

PATENT NO.     : 6,505,056 B1
DATED          : January 7, 2003
INVENTOR(S)    : Wen-Shan Liou It is certified that error appears in the above-identified patent and that said Letters Patent is hereby corrected as shown below:

<u>Title page,</u>
Item [73], Assignee, should be inserted as follows:
-- Assignee:    Institute for Information Industry, Taipei, Taiwan, R.O.C. --

Signed and Sealed this

Fourth Day of May, 2004

JON W. DUDAS
*Acting Director of the United States Patent and Trademark Office*